(No Model.)  2 Sheets—Sheet 1.

B. A. FISKE.
METHOD OF FINDING THE POSITION OF DISTANT OBJECTS.

No. 418,510.  Patented Dec. 31, 1889.

WITNESSES:
Gustave Dieterich.
William Goebel.

INVENTOR
Bradley A. Fiske
BY Park Benjamin
his ATTORNEY (No Model.) 2 Sheets—Sheet 2.

B. A. FISKE.
METHOD OF FINDING THE POSITION OF DISTANT OBJECTS.

No. 418,510. Patented Dec. 31, 1889.

WITNESSES:
Gustave Dietrich
William Goebel

INVENTOR
Bradley A. Fiske
BY Park Benjamin
his ATTORNEY

UNITED STATES PATENT OFFICE.

BRADLEY A. FISKE, OF THE UNITED STATES NAVY.

METHOD OF FINDING THE POSITION OF DISTANT OBJECTS.

SPECIFICATION forming part of Letters Patent No. 418,510, dated December 31, 1889.

Application filed June 29, 1889. Serial No. 316,045. (No model.)

*To all whom it may concern:*

Be it known that I, BRADLEY A. FISKE, of the United States Navy, have invented a new and useful Improvement in Methods of Finding the Position of Distant Objects, of which the following is a specification, reference being had to the accompanying drawings, in which—

Figure 1:
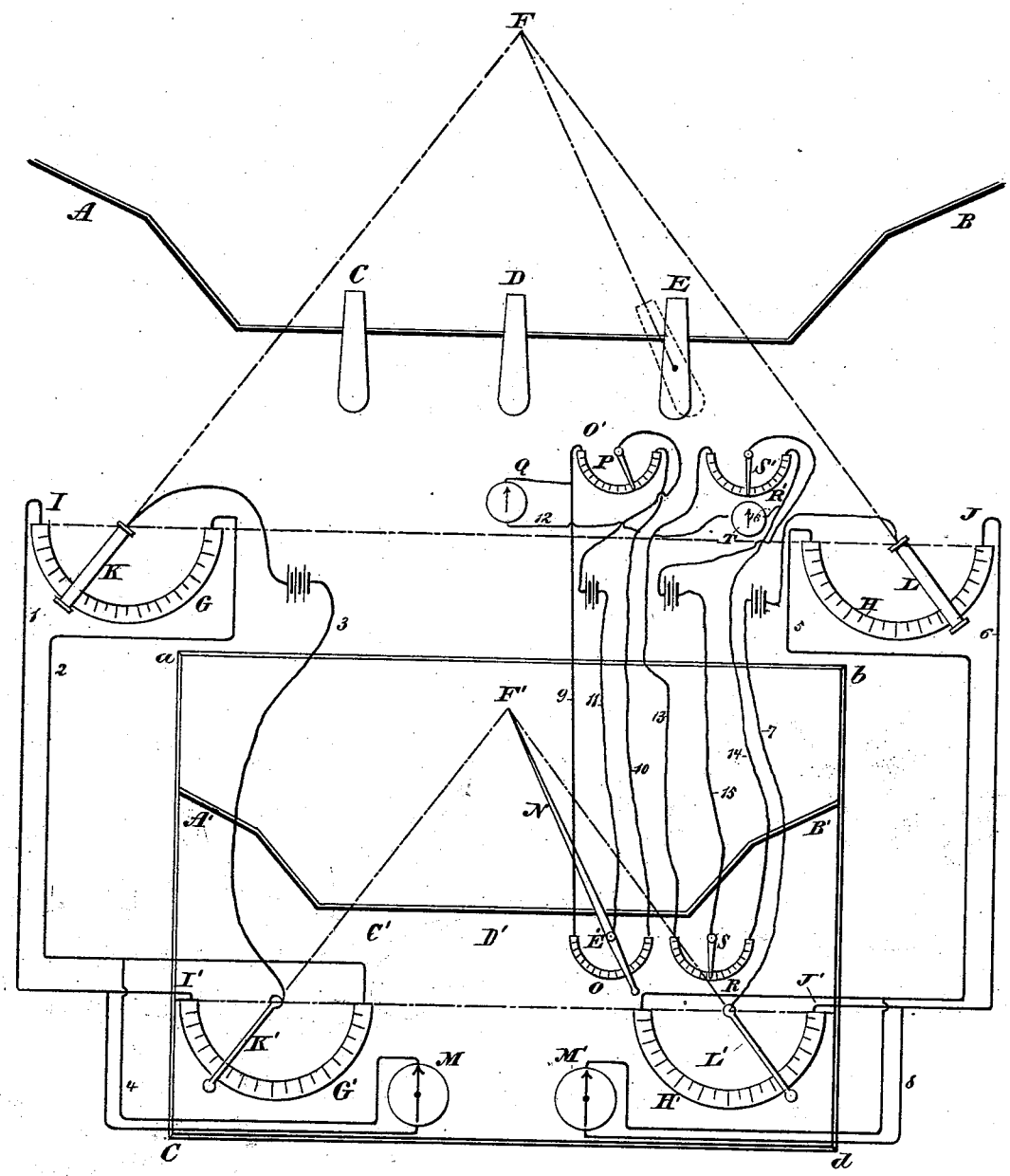
Figure 2:
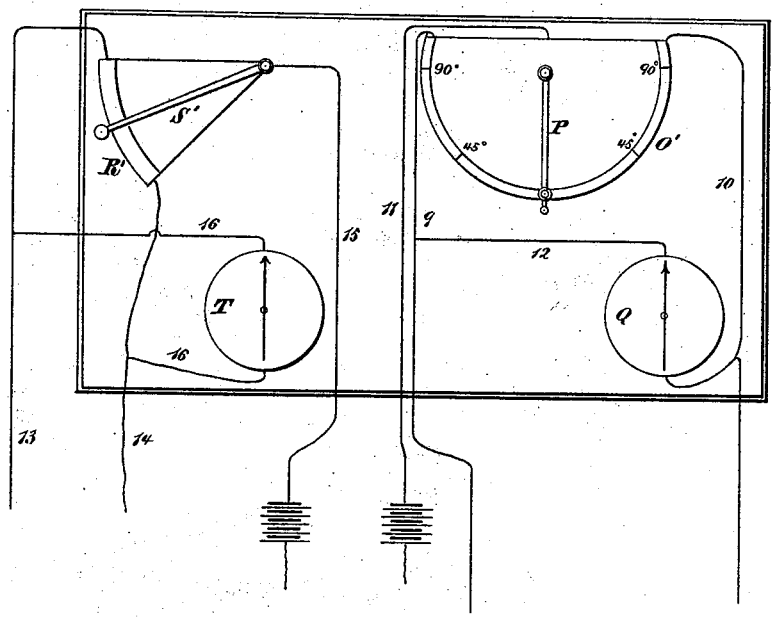
Figure 3:
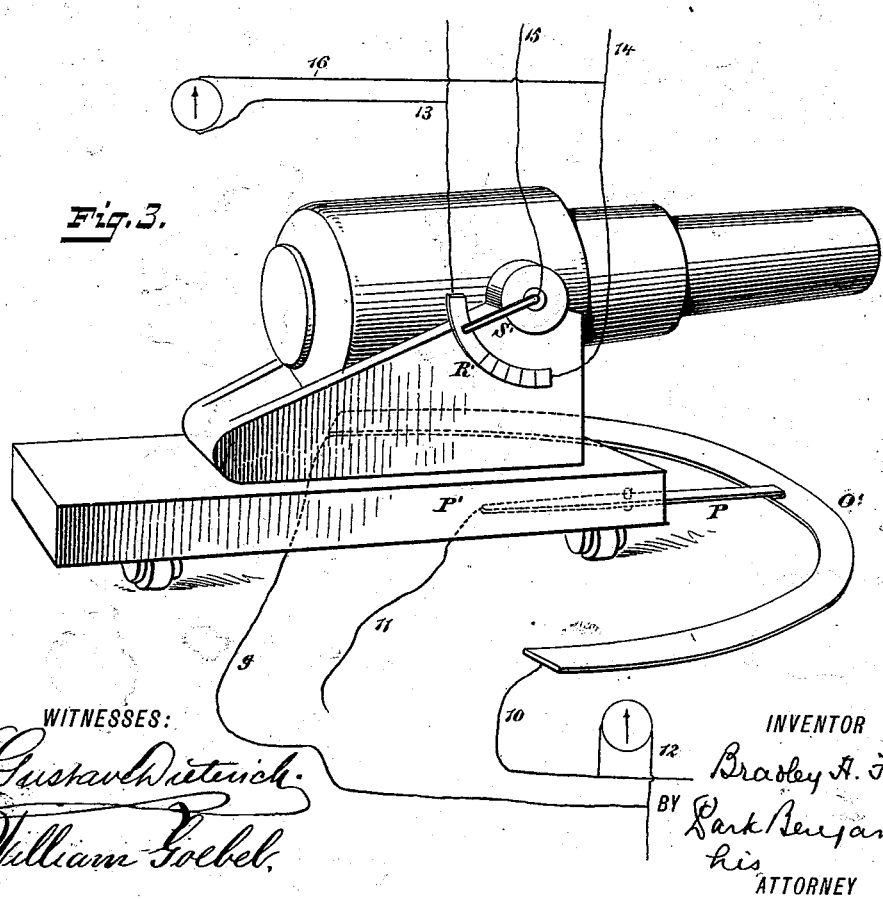

Figure 1 is a diagram illustrating symbolically a general arrangement of certain apparatus which constitutes one practical embodiment of my said method. Fig. 2 represents the indicating devices as used at the gun, on a larger scale than is shown in Fig. 1. Fig. 3 represents a gun to which are directly attached pointers or arms moving over graduated arcs of conducting material, so that the proper positions of the gun in train or in elevation may be determined by an adjustment of the gun itself.

Similar letters of reference indicate like parts.

The object of my invention is to provide a method by which the individual in charge of a gun may direct it upon a given target when the distance of said target is not known to him, and even when he is unable to see the target, by reason of fog, smoke, or other causes, from the point where his gun is located.

My invention consists in the method, hereinafter set forth, whereby observers stationed at points distant from the gun itself, which points command a good view of the area within the range of said gun, are enabled to discover the bearing and range of a target from the position of the gun, and to communicate to the person in charge of said guns said bearing and range.

Referring to Fig. 1, A B represent a line of the parapet of a fort or other defensive work.

C, D, and E are guns located in said fort and commanding the area which includes the position of the target F. The object to be attained is to lay all of the guns C D E correctly upon said target, although the persons in charge of said guns may be unable to see said target and be ignorant of its bearing and distance.

For purposes of clearness, in the following description I shall refer only to the necessary operations connected with one gun, as E, premising that the same method is followed in connection with every other gun.

G and H are two arcs of conducting material placed symmetrically with respect to a base-line I J. These arcs are located at stations distant from the positions of the guns, and so situated that a view of the area to be protected by said guns will not be cut off from said stations by smoke, points of land, or other obstacles. For this reason it is better that elevated positions should be chosen for said stations.

K and L are two pivoted telescopes, the free ends of which move over the arcs G and H, and constantly maintain electrical contact therewith. These telescopes may be directed upon the target F, which will therefore be at the intersection of the two lines of sight of said telescopes.

Located at a station distant both from the guns and from the positions of the arcs G H, and preferably at a place safe from the effects of the enemy's fire, I establish another station, which, for convenience, I will call a "directing-station," in which is a chart or map, represented by the rectangles $a\ b\ c\ d$. On this chart the line A' B' represents the line A B of the parapet of the fort, and the points C' D' E' correspond to the centers above which the guns C D E are laterally turned. The chart $a\ b\ c\ d$ represents the area within the range of the guns C D E on some definite reduced scale, so that distances taken on said chart represent actual distances. On said chart is drawn a line I' J' corresponding to the base-line I J, and symmetrically disposed with reference to said base-line are arcs of conducting material G' and H'.

K' and L' are pivoted arms similar to the arms K L, the free ends of which pass over and make constant contact with the arcs G' and H'. Arc G' is similar in form and in electrical resistance per unit length to the arc G, and the arc H' is likewise similar in the same particular to the arc H. Extending from the extremities of the arc G to the extremities of the arc G' are wires 1 and 2, and extending from the pivoted telescope K to the pivoted arm K' is a wire 3, which includes a battery. Connected in loop from the wires 1 2 by a wire 4 is a galvanometer M. It will be evident that the wires 1 2 3

4, the arcs G G', the battery, and the galvanometer M are connected in circuit in the form of a Wheatstone bridge, and that the effect of moving the telescope K, for example, to the right on arc G is to increase the resistance in the member 1 of the bridge and decrease it in the member 2, and that the same is true of a similar movement of the arm K' over the arc G'. Therefore, if the telescope K be set at a certain position on the arc G, it is simply necessary to set the arm K' to such a position on the arc G' as that the galvanometer M shall show no deflection, when the bridge will of course balance, and therefore the angle made by the arm K' to the base-line I' J' will be equal to the angle made by the telescope K to the base-line I J. The extremities of the arc H are connected to the extremities of the arc H' by wires 5 and 6, and the pivots of the telescope L and arm L' are connected by wire 7, which includes a battery.

M' is a galvanometer included in a loop 8 from the wires 5 and 6. It will be seen that this arrangement of the two arcs H H' and circuit-connections is the same as that of the arcs G G' and associated parts, and that therefore when the arm L' is placed at the same angle with reference to the base-line I' J' as the telescope L is placed with reference to the base-line I J the galvanometer M' will show no deflection, and the bridge will balance, as in the preceding case. It follows, therefore, that if the two telescopes K and L be sighted upon the target F by observers located at said telescopes, and if a third observer moves the arms K' L' and at the same time watches the galvanometers M M', he will have placed the arms K' L' at precisely the same angles as the telescopes K L when both galvanometers show zero reading. Inasmuch as the chart $a\ b\ c\ d$ bears a definite proportion to the area which includes the position of the target F, it follows that if the axes of the arms K' L' be prolonged they will intersect at the position F', which would represent on the chart the actual position of the target F.

Upon the chart $a\ b\ c\ d$ are pivoted three pointers, only one of which, for convenience, is shown at N, and these pointers are pivoted at the points C', D', and E', which, as already stated, correspond to the centers of horizontal motion or train of the guns C D E. Consequently, if the pointer N be turned on its pivot, it will correspond to the positions of the gun E when said gun is turned on its pivot. One arm of the pointer N is long enough to sweep over the area which includes the target. The other arm bears upon and makes electrical contact with an arc O of conducting material. At the gun E is arranged a similar arc of conducting material O', and sweeping over this arc is a pivoted arm P, the free end of this arm making contact with said arc. The extremities of the arc O' are connected to the extremities of the arc O by wires 9 and 10. The pivot-point of arm P is connected to the pivot-point E' by wire 11, which includes a battery. Located near the arc P is a galvanometer Q, arranged in a loop-circuit 12 from the wires 9 and 10. It will be apparent that the arcs O O', the galvanometer Q, and the battery are here connected in a Wheatstone bridge in precisely the same manner as are the arcs G G' and circuit-connections, and therefore, for the same reasons already explained with reference to the arcs G G' and the moving arms K K', it follows that when the arm N and the arm P are both set at precisely the same angle the galvanometer Q will show no deflection and the bridge will balance. Consequently, if an observer at the chart $a\ b\ c\ d$ brings the arm N upon the point F', which is the intersection of lines drawn from the arms K' L', he will have established the angle at which the gun E must be laid with reference to the base-line I J in order that said gun may point in the direction of the target F. At the same time, by the movement of said arm N over the arc O, the observer throws into the circuit a fractional portion of said arc having a resistance proportionate to the angle, and hence, in order to interpose an equal resistance in the bridge, the person in charge of the gun over which is located the arc O' must move the arm P over a similar angle. He knows that he has moved it over this similar angle by the galvanometer Q reading zero. He has, therefore, simply to read the angle from the arc O' and lay the gun at the same angle.

I have so far provided for the training of the gun upon the target, but not for its adjustment for range. This adjustment I make in a similar manner, as follows: I measure the distance of the target from the gun by any known method—such, for example, as by measuring the length on the chart between the point F' and the point E'.

R is an arc of conducting material, and S is a pivoted arm sweeping over and making contact with said arc.

R' is an arc similar to the arc R, but located near the gun E.

S' is an arm similar to the arm S, and moving over and making contact with the arc R'.

The extremities of the arcs R' and R are connected by wires 13 and 14. The wire 15 connects the pivot-points of the arms S S' and includes a battery. A galvanometer T is included in a loop-circuit 16 from the wires 13 and 14. It will be seen that the arrangement of the arcs R R' and their arms is substantially similar to the arrangement of the arcs O O' or H H' or G G' with their associated arms. Consequently, when the arm S is placed at a certain angle, the galvanometer T will show zero, when the arm S' is placed at that same angle, but not otherwise. The electrical resistance of the two arcs is similar for equal divisions of said arc, and for each division of each arc—as, for example, for each degree—the resistance corresponds to a certain distance lineally measured. Consequently, if the distance F' E' is known, the observer has only to set the arm S over such a fractional portion of the arc R as that there shall be thrown into the circuit a resistance corresponding to said distance F' E'. In order to balance the bridge between the arcs R' R, the observer at arc R' must place the arm S' at the same angle as that at which arm S has been set. He will thus learn the angle at which said arm S has been set, and consequently the distance of the object. Then it remains simply for him to lay his gun at the proper elevation corresponding to said distance, using for that purpose the ordinary sight bar or quadrant.

In the drawings, Fig. 2, I have shown a convenient arrangement of the arcs R' O' and the galvanometers Q T, so that an observer can easily manipulate the arms P and S' by watching the galvanometers Q T.

In the case just described the observer at the chart $a\,b\,c\,d$ signals the distance or range of the object to the person at the gun, and the latter adjusts the gun at the proper angle of elevation to cause it to project its shot over that range. It will be obvious that, instead of signaling the range, the observer at the chart $a\,b\,c\,d$ may himself determine the proper elevation of the gun and set the arm S at that angle. The person at the gun will then place the arm S' at the same angle in the manner already described, and thus learn at once the angle of elevation of the gun.

My method, so far as I have described it, involves the signaling to a person stationed at the gun of information as to the range and bearing of the target or of simply an angle of elevation, which enables him properly to lay his gun. It is not, however, at all necessary that this information should be imparted to any person at the gun, or that, in fact, any one manipulating the piece should be informed what the exact elevation or the exact training of the gun is. Instead of arranging the arc R' away from the gun, I may apply it directly to the gun-carriage, as shown in Fig. 3, and I may apply the arm S' to the gun itself, so that the movement of the gun on its trunnions for elevation or depression will cause the arm S' to sweep over the arc R'; and so, also, I may arrange on the flooring adjacent to the gun arc O' and connect the arm P, for example, to the gun-carriage, so that when the gun is trained and so turns upon its pivot—supposed, for example, to be at the point P'—the arm P will sweep over and maintain contact with the arc O'. It will be seen, therefore, that when the observer at the chart $a\,b\,c\,d$ places the arm N at the proper angle on the arc O it will be necessary simply to train the gun, Fig. 3, until the arm P, which it carries, makes a corresponding angle on the arc O', and, similarly, the observer at the chart $a\,b\,c\,d$ sets the arm S at an angle corresponding to the elevation of the gun for the range indicated between the points E' and F' on the chart, and the gun itself is then elevated or depressed until the arm S' makes a similar angle on the arc R', the position of the gun in both cases being shown by the indications of the galvanometers Q and T, as before.

I claim—

1. The method of finding the position of a distant object, which consists, first, in directing two alidade-arms K L, moving over arcs G H of conducting material, (said arcs having their extremities on a base-line I J,) in line with said object; second, placing two pointers or arms K' L', moving over arcs G' H' of conducting material, located at a distant station and similarly disposed with reference to a base-line I' J' at the same angle as said arms K L, and thereby establishing an electrical balance in each of two circuits, one circuit including the arcs G G', arms K K', a battery, and an indicating apparatus—such as a galvanometer—the other circuit including the arcs H H', arms L L', a battery, and an indicating apparatus; third, noting the point of intersection of the lines of direction of the arms K' L' on a chart $a\,b\,c\,d$, representing the area including the position of said distant object on a reduced scale.

2. The method of finding the position of a distant object with reference to a predetermined point, which consists, first, in directing two alidade-arms K L, moving over arcs G H of conducting material, (said arcs having their extremities on a base-line I J,) in line with said object; second, placing two pointers or arms K' L', moving over arcs G' H' of conducting material, located at a distant station and similarly disposed with reference to a base-line I' J' at the same angle as said arms K L, and thereby establishing an electrical balance in each of two circuits, one circuit including the arcs G G', arms K K', a battery, and an indicating apparatus—such as a galvanometer—the other circuit including the arcs H H', arms L L', a battery, and an indicating apparatus; third, noting the point of intersection of the lines of direction of the arms K' L' on a chart $a\,b\,c\,d$, representing the area including the position of said distant object on a reduced scale; fourth, determining on said chart the distance and bearing of said point of intersection from said predetermined point.

3. The method of finding the position of a distant object with reference to a predetermined point, which consists, first, in directing two alidade-arms K L, moving over arcs G H of conducting material, (said arcs having their extremities on a base-line I J,) in line with said object; second, placing two pointers or arms K' L', moving over arcs G' H' of conducting material, located at a distant station and similarly disposed with reference to a base-line I' J' at the same angle as said arms K L, and thereby establishing an electrical balance in each of two circuits, one circuit including the arcs G G', arms K K', a battery, and an indicating apparatus—such as a galvanometer—the other circuit including the arcs H H', arms L L', a battery, and an indicating apparatus; third, noting the point of intersection of the lines of direction of the arms K' L' on a chart $a\,b\,c\,d$, representing the area including the position of said distant object on a reduced scale; fourth, determining on said chart the distance and bearing of said point of intersection from said predetermined point; fifth, signaling to said predetermined point the said bearing and distance.

4. The method of finding the position of a distant object with reference to a predetermined point and indicating the same at said point, which consists, first, in determining the position of said object; second, marking said position on a chart or map representing on a reduced scale an area including the position of said object; third, directing a pivoted index or pointer to point to said marked position, the said pointer moving over and making contact with an arc of conducting material, fourth, moving an index-pointer located at said predetermined point and traversing a similar arc of conducting material until an electrical balance is attained in a circuit including said arcs, a battery, and an indicating apparatus, such as a galvanometer.

BRADLEY A. FISKE.

Witnesses:
S. O. EDMUNDS,
M. BOSCH.